No. 639,821. Patented Dec. 26, 1899.
A. MATHEY-DORET.
PROCESS OF MANUFACTURING BALANCE WHEELS FOR WATCHES.
(Application filed Mar. 27, 1899.)
(No Model.)
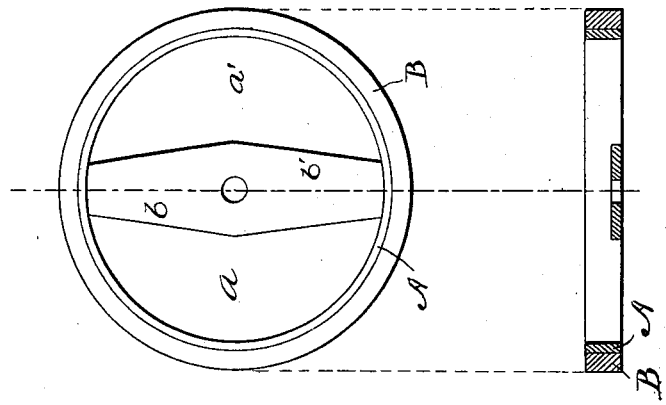
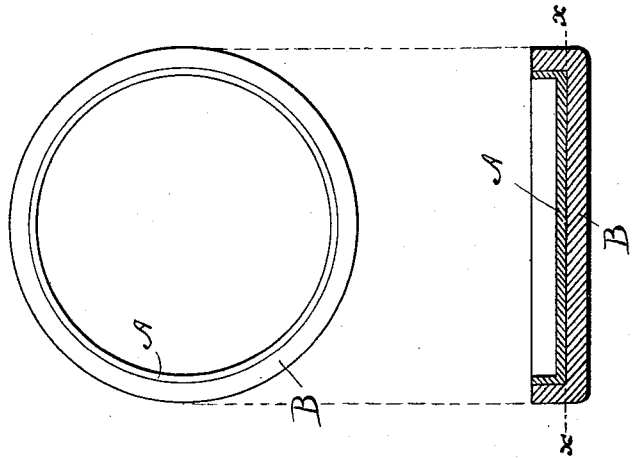
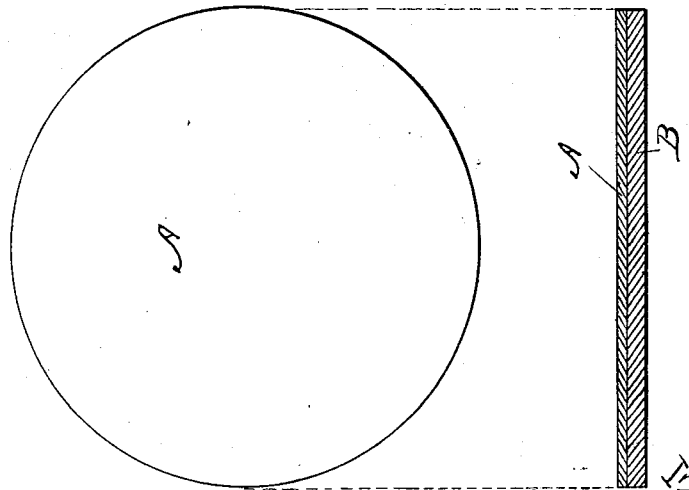
Witnesses:
Inventor,
Alfred Mathey-Doret,
by Richards & Co.
Attys.

UNITED STATES PATENT OFFICE.

ALFRED MATHEY-DORET, OF LA CHAUX-DE-FONDS, SWITZERLAND.

PROCESS OF MANUFACTURING BALANCE-WHEELS FOR WATCHES.

SPECIFICATION forming part of Letters Patent No. 639,821, dated December 26, 1899.

Application filed March 27, 1899. Serial No. 710,650. (No model.)

*To all whom it may concern:*

Be it known that I, ALFRED MATHEY-DORET, a citizen of Switzerland, and a resident of La Chaux-de-Fonds, canton of Neufchâtel, Switzerland, have made certain new and useful Improvements in Processes for the Manufacture of Balance-Wheels for Watches, of which the following is a specification.

Until now bimetallic balance-wheels—that is to say, those formed by a rim composed of two metals, steel and brass—have been made in soldering the outside brass rim upon the inside steel part.

The process which is the object of my invention is totally different from that one. It consists in plating together two or several metals or metallic alloys, then in stamping and cutting them out suitably, so as to obtain a bimetallic balance-wheel such as those generally used.

Figure 1 shows in plan and in section a disk or plate formed of two metals plated together. Fig. 2 shows a plan and section of the disk after it is subjected to the action of the dies. Fig. 3 shows in plan and section the article after it is cut.

The annexed drawings show, as an example, the different phases through which the manufacture of a balance-wheel must principally go according to process. As it is seen, Fig. 1 shows in plan and in section a washer or disk plated of two metals, of which A is, for example, steel, while B is bronze. That disk has been cut into a band or leaf of plated metals, out of which, of course, a certain number of them may be cut. In a die of a suitable form the disk is embossed, as is shown in plan and in section by Fig. 2, so that the steel A is inside the calotte thus obtained. Then the part of B underneath the line $x\ x$ is cut by turning or milling. There is then some of the metal or alloy B left only on the circumference of the calotte, and it remains only to cut out the two inside parts $a$ and $a'$ to form the arms $b$ and $b'$. It is evident that a balance-wheel thus made will present more homogeneity and regularity than with the old process. Besides, this new one produces balance-wheels of which the rim may be composed not only of two but of several metals— as, for example, copper, steel, and nickel. In this case it would be sufficient to plate those metals together in suitable order and then to proceed for the stamping and cutting out, as described above.

In certain cases the metal B that is at the lower part of the arms $b\ b'$ below the line $x\ x$ may be left uncut. The balance-wheel may be then finished like the others. It may be cut to obtain compensation and provided with any number of screws on the periphery of its rim.

By the term "plated" is meant two or several metals attached together in a suitable way, either by soldering or by hot pressure with a hydraulic press or otherwise.

Having now particularly described the nature of my said invention and in what manner it may be executed, I declare that what I claim is—

The herein-described process consisting in cutting out from a plate formed of two layers of metal a disk, striking said disk up into cup form, removing the lower layer of the bottom of the cup and cutting out the upper or interior layer to form the arms of the balance-wheel.

In witness whereof I have hereunto set my hand in presence of two witnesses.

ALFRED MATHEY-DORET.

Witnesses:
ARMAND TERRELD,
JULES CHAPREY.